(12) United States Patent
Xiang et al.

(10) Patent No.: US 9,721,038 B1
(45) Date of Patent: Aug. 1, 2017

(54) COLLABORATIVE DATA VISUALIZATION

(71) Applicant: EMC Corporation, Hopkinton, MA (US)

(72) Inventors: Dong Xiang, Shanghai (CN); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 13/827,452

(22) Filed: Mar. 14, 2013

(51) Int. Cl.
*G06F 7/00* (2006.01)
*G06F 17/30* (2006.01)

(52) U.S. Cl.
CPC ............... *G06F 17/30943* (2013.01)

(58) Field of Classification Search
CPC ................................................ G06F 17/30943
See application file for complete search history.

(56) References Cited

U.S. PATENT DOCUMENTS

| | | | |
|---|---|---|---|
| 2008/0126480 A1* | 5/2008 | Hintermeister | G06Q 10/10 709/204 |
| 2009/0083637 A1* | 3/2009 | Skakkebaek | G06Q 10/10 715/751 |
| 2012/0101985 A1* | 4/2012 | Kemp et al. | 707/609 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

\* cited by examiner

*Primary Examiner* — Usmaan Saeed
*Assistant Examiner* — Paul Kim
(74) *Attorney, Agent, or Firm* — Ryan, Mason & Lewis, LLP

(57) ABSTRACT

Information processing techniques for providing collaborative data visualization in a computing system. For example, a method comprises the following steps. A data visualization asset is obtained. The data visualization asset comprises a data component, an execution context component, and a visual asset component, wherein at least one visual asset of the visual asset component is generated from a data set of the data component by execution of at least one process of the execution context component. Collaborative modification of the data visualization asset by at least a portion of a plurality of users is enabled in accordance with a given policy. Information corresponding to the modification of the data visualization asset is tracked.

20 Claims, 6 Drawing Sheets

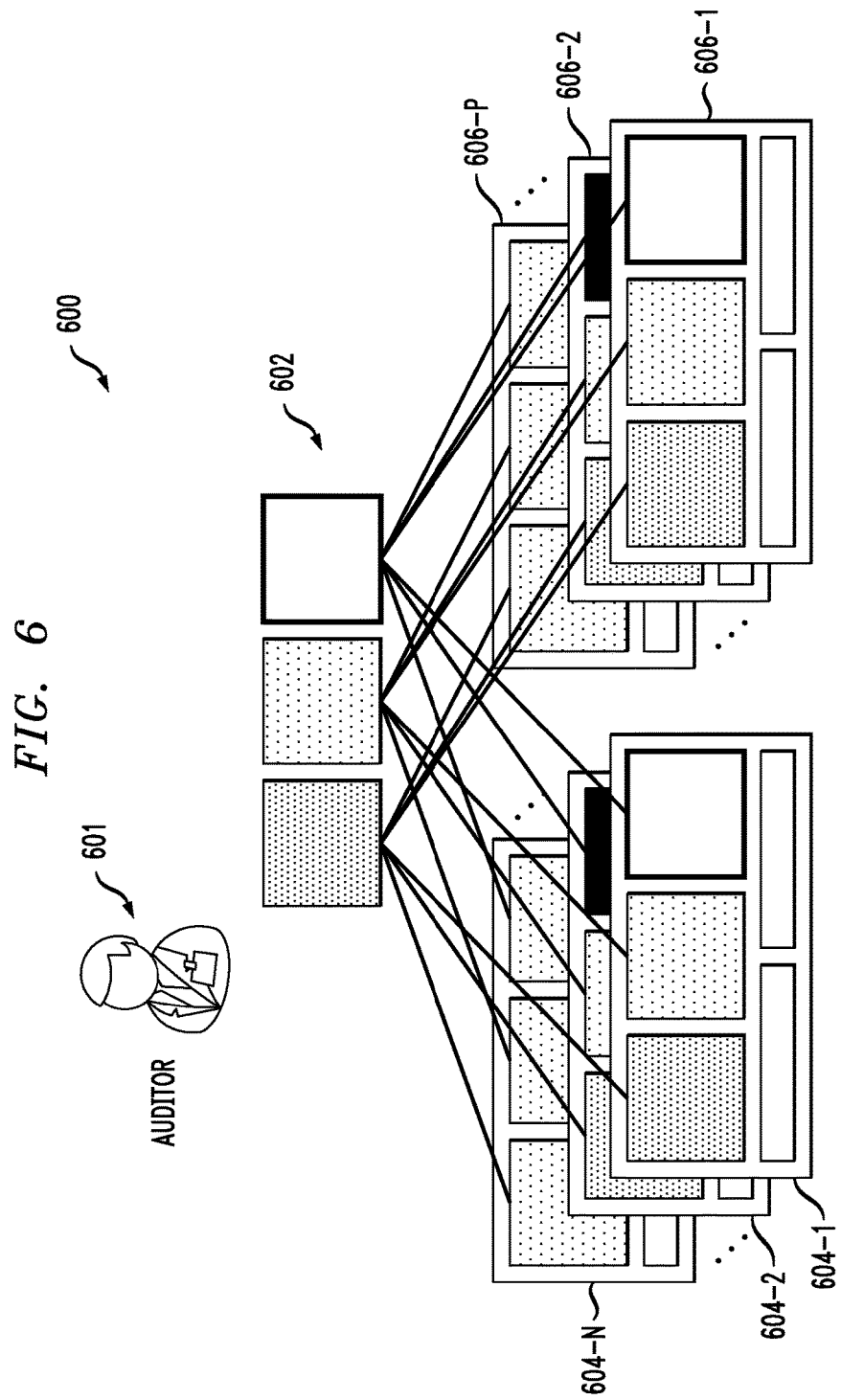

COLLABORATIVE DATA VISUALIZATION

FIELD

The field relates to information processing, and more particularly to information processing techniques for providing collaborative data visualization in a computing system.

BACKGROUND

Data visualization is important in the process of presenting information and knowledge from data sets, especially data sets that are high dimensional in nature. Such high-dimensional data sets are known to be referred to as "big data." A data set characterized as big data is prohibitively large such that it is beyond the capabilities of commonly used software tools to manage/process the data, or at least to do so within a reasonable time frame.

Furthermore, the high dimensionality associated with big data typically results in significant difficulty in effectively presenting such data. Also, it is not uncommon for more than one user (e.g., data scientist) to have to work on the same data set and visualization effort. As a result, it is typical that significant amounts of computing resources and manpower must be expended to generate an effective data visualization using existing data visualization approaches.

As such, a need exists for improved data visualization techniques, especially when dealing with big data type data sets.

SUMMARY

Embodiments of the present invention provide information processing techniques for providing collaborative data visualization in a computing system.

For example, in one embodiment, a method comprises the following steps. A data visualization asset is obtained. The data visualization asset comprises a data component, an execution context component, and a visual asset component, wherein at least one visual asset of the visual asset component is generated from a data set of the data component by execution of at least one process of the execution context component. Collaborative modification of the data visualization asset by at least a portion of a plurality of users is enabled in accordance with a given policy. Information corresponding to the modification of the data visualization asset is tracked.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

In a further embodiment, a system comprises a plurality of computing devices, and a collaborative data visualization system operatively coupled to the plurality of computing devices and configured to perform steps of the above-described method.

Advantageously, embodiments of the invention enable multiple users to collaborate and share their efforts on one or more data visualizations of some data set, and enable an enterprise to consolidate and maintain regulation/standardization on its data visualizations.

These and other features and advantages of the present invention will become more readily apparent from the accompanying drawings and the following detailed description.

BRIEF DESCRIPTION OF THE DRAWINGS

FIG. 6 shows an enterprise level visual asset consolidation methodology in accordance with one embodiment of the invention.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Further, the phrase "data visualization," as used herein, refers to a visual presentation of data. For example, this may include, but is not limited to, the display of one or more data objects on one or more display screens associated with a computing system. In illustrative embodiments, "data visualization assets" are described which are assets generated in accordance with data visualization techniques described herein, i.e., results of the collaborative data visualization methodologies. Such data visualization assets comprise data objects as well as other components, as will be described in detail below.

As used herein, the phrase "data object" or simply "object" refers to any given data item or data unit that may be part of a data set. An object or data object may take on any form and it is to be understood that the invention is not limited to any particular form. For example, an object may be electronic data such as one or more web pages, documents, files, images, videos, reports, graphs, illustrations, text, electronic mail (email), or any other type of data set, data item, or data unit. Thus, embodiments of the invention are not limited to any particular type of data object.

Also, as used herein, the term "enterprise" refers to an organization, business, company, corporation, entity, group, a set of one or more individuals, or the like, that operates to perform one or more functions, operations or processes to achieve some goal.

Figure 1:
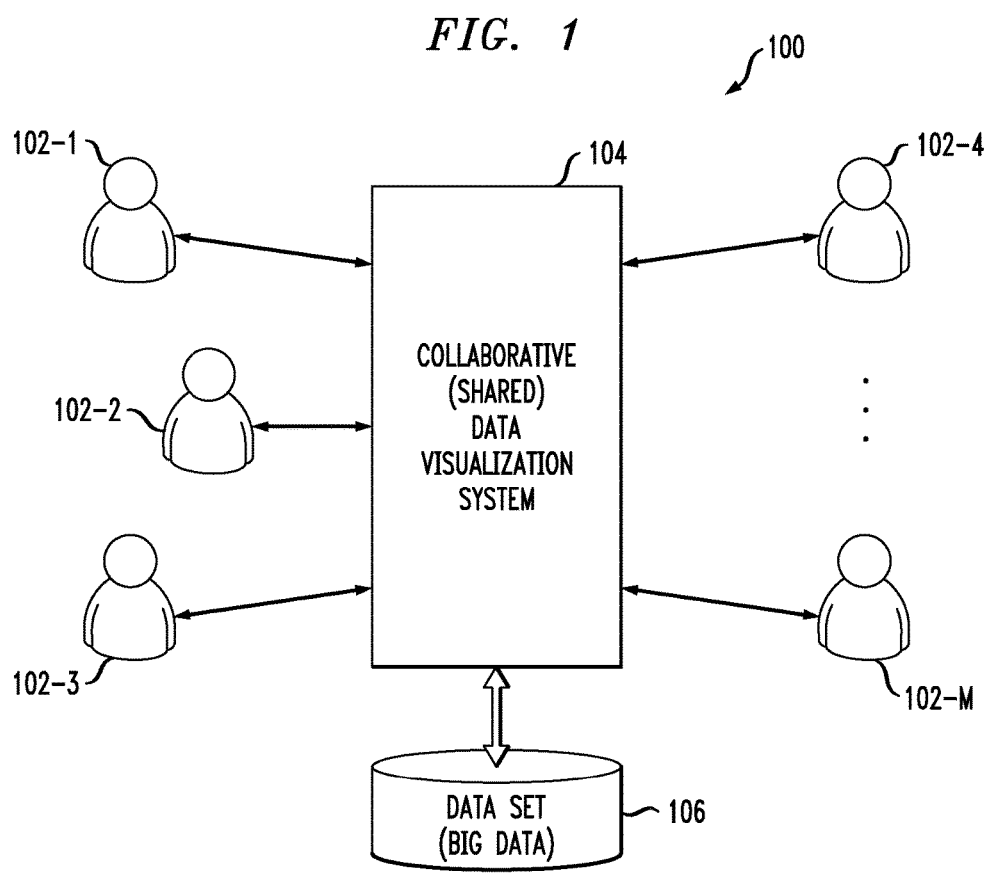
FIG. 1 shows a collaborative data visualization system environment in accordance with one embodiment of the invention.

FIG. 1 shows a collaborative data visualization system environment 100 in accordance with one embodiment of the invention. As shown, a plurality of users 102-1, . . . , 102-M are in communication with a collaborative data visualization system 104. The collaborative (or shared) visualization system 104 enables the multiple users to collaborate and share their efforts on one or more data visualizations of some data set, e.g., big data set 106 as shown in FIG. 1. For example, the multiple users may be data scientists working on a common set of data, although other types of users may utilize the system and multiple data sets may be the subject of the collaboration.

Furthermore, in a scenario where multiple users are involved in the same enterprise, it is realized that it is beneficial for the enterprise to consolidate and maintain regulation/standardization on its data visualizations. This is particularly advantageous for an enterprise that is globally distributed with many business units, having many potential users located remotely from one another. Thus, one user should be able to seamlessly continue work on a data visualization effort started by one or more other users remotely located from the user. The collaborative data visualization system 104 is configured to provide such regulation/standardization, as will be explained in further detail below.

Also, the collaborative data visualization system 104 is configured to be extensible and pluggable, which enables a user to introduce new data visualization approaches and new data visualization toolkits for use by other users.

In a big data type data set environment, the collaborative data visualization system 104 may be implemented in conjunction with the big data architecture referred to as the EMC Greenplum™ HD Data Computing Appliance (EMC Corporation, Hopkinton, Mass.) which adapts Apache Hadoop™ (Apache Software Foundation) open-source software to provide "big data" analytics and services.

While data set 106 is depicted as a big data type data set, it is to be understood that the collaborative data visualization system and methodologies described herein are applicable to any type of data sets that are to be visualized.

Although the system elements 104 and 106 are shown as separate elements in FIG. 1, these elements or portions thereof may be implemented at least in part on a common processing platform. In other embodiments, one or more of the system elements 104 and 106 may each be implemented on a separate processing platform, such as the processing platform to be described below in conjunction with FIG. 2. By way of example only, the collaborative data visualization system 104 may be implemented on a first processing device of a first processing platform and the data set 106 may be implemented on a second processing device of a second processing platform. Other system elements (not expressly shown in FIG. 1) may be implemented on one or the other of these processing devices/platforms, or on one more other processing devices/platforms. It is also to be understood that a given embodiment of the system 100 may include multiple instances of the elements 104 and 106, although only single instances of such elements are shown in the system diagram for clarity and simplicity of illustration.

Figure 2:
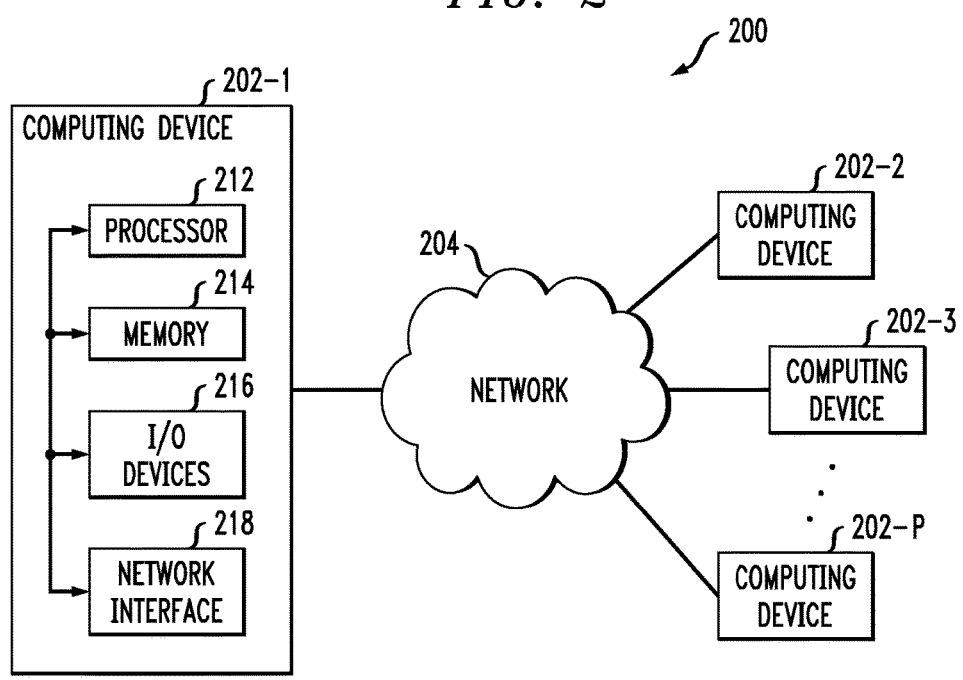
FIG. 2 shows a distributed information processing platform on which the collaborative data visualization system environment of FIG. 1 is implemented in accordance with one embodiment of the invention.

An example of a processing platform on which the collaborative data visualization system environment 100 of FIG. 1 may be implemented is information processing platform 200 shown in FIG. 2. The processing platform 200 in this embodiment comprises at least a portion of the system environment 100 and includes a plurality of computing devices, denoted 202-1, 202-2, 202-3, . . . 202-P, which communicate with one another over a network 204. One or more of the elements of system environment 100 may therefore each run on a server, computer or other processing platform element, which may be viewed as an example of what is more generally referred to herein as a "processing device." Note that one or more computing devices in FIG. 2 may be servers, while one or more computing devices may be client devices (operated by users 102 in FIG. 1). As illustrated in FIG. 2, such a device generally comprises at least one processor and an associated memory, and implements one or more functional modules for controlling certain features of system environment 100. Again, multiple elements or modules may be implemented by a single processing device in a given embodiment.

The computing device 202-1 in the processing platform 200 comprises a processor 212 coupled to a memory 214. The processor 212 may comprise a microprocessor, a microcontroller, an application-specific integrated circuit (ASIC), a field programmable gate array (FPGA) or other type of processing circuitry, as well as portions or combinations of such circuitry elements. The memory 214 may be viewed as an example of what is more generally referred to herein as a "computer program product." A computer program product comprises a processor-readable storage medium (i.e., non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Computing device 202-1 also includes input/output (I/O) devices 216 which includes, for example, one or more input devices (e.g., keyboard, mouse, etc.) for entering data to the computing device, and one or more output devices (e.g., display, speaker, etc.) for presenting results associated with the computing device. It is to be understood that portions of one or more data visualization assets generated in accordance with embodiments of the invention can be displayed on an output device represented by 216.

Also included in the computing device 202-1 is network interface circuitry 218, which is used to interface the device with the network 204 and other system components. Such circuitry may comprise conventional transceivers of a type well known in the art.

The other computing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the collaborative data visualization techniques illustratively described herein can be provided as one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement the one or more cloud services that provide the collaborative data visualization functionality and features described herein.

Illustrative details of the collaborative data visualization system 104 will now be described with reference to FIGS. 3 through 6.

Figure 3:
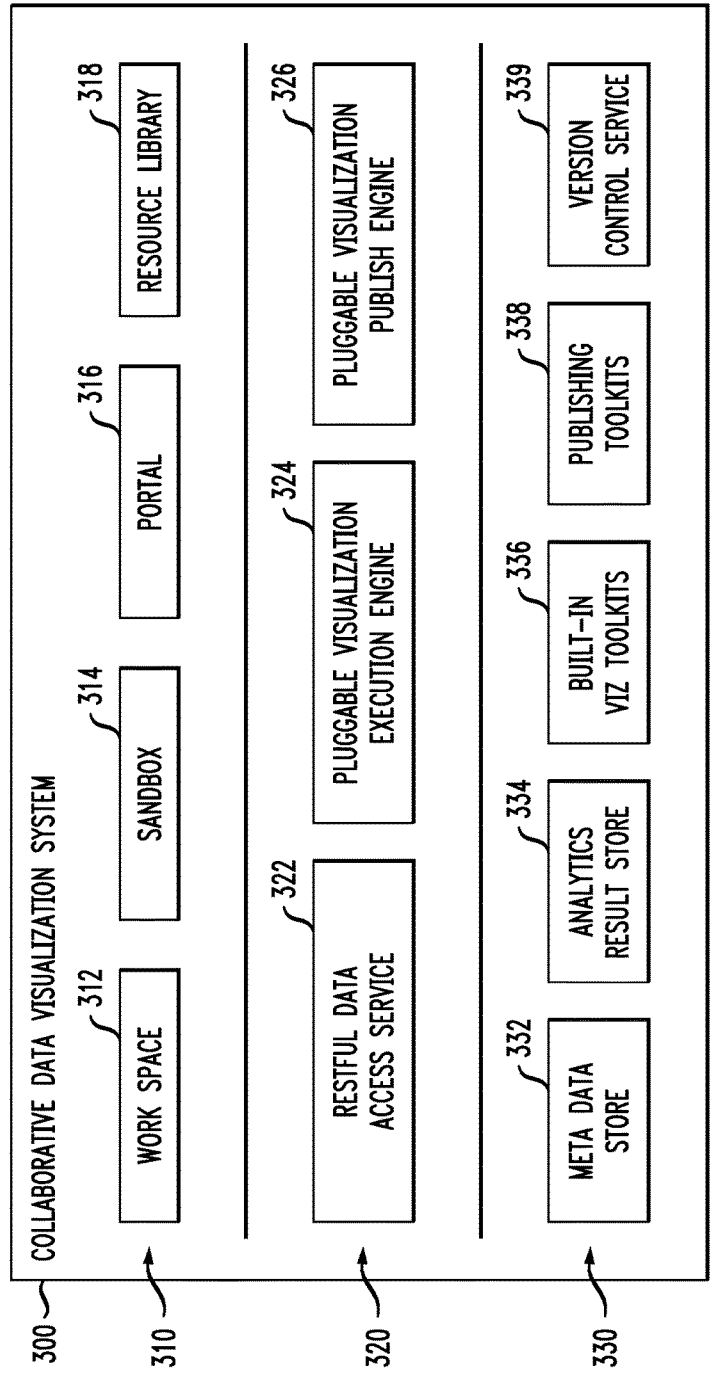
FIG. 3 shows a collaborative data visualization system in accordance with one embodiment of the invention.

FIG. 3 shows a collaborative data visualization system in accordance with one embodiment of the invention. Note that system 300 is one example of an implementation of system 104 in FIG. 1.

The system architecture in this illustrative embodiment includes three functional layers 310, 320 and 330. Each component in layers 310, 320 and 330 is understood to include at least a portion of the computing device components (e.g., processor, memory, I/O devices, etc.) described above in computing device 202 (FIG. 2).

Layer 310 is a layer of components which are accessed directly by users of the system (e.g., users 102-1, . . . , 102-M). As shown in layer 310, components include a workspace 312, a sandbox 314, a portal 316 and a resource library 318. In general, a user generates a data visualization asset in workspace 312, tests the data visualization asset in sandbox 314, and shares it with other users via portal 316. As understood in computer science terminology, a "work space" comprises the computing resource environment that allows the user to develop a data object or process, while a "sandbox" comprises the computing resources environment (which can be the same, different, or otherwise overlap with that of the work space) that allows the user to test the data object or process. Additionally, data objects or processes that are used in the data visualization may be selected from resource library 318. The resource library 318 can include both standard data objects/processes as well as custom data objects/processes.

Layer 320 includes middleware components. As shown, such middleware components include a RESTful (Representational State Transfer) data access service 322, a pluggable visualization execution engine 324, and a pluggable visualization publish engine 326. These middleware components enable pluggable data visualization execution and data visualization publishing. More particularly, component 322 provides a unified data access interface for all other components in the system. The data access interface allows the user to access meta data/row data/analytic results which are stored in underlying databases. Component 324 abstracts/defines how a data visualization can be generated, which includes (but is not limited to) where to obtain the raw data/analytic result, where to get the scripts/execution files to create the data visualization, how to trigger these script/execution files, and where to store the results. Component 326 abstracts/defines how a visualization can be presented according to specific requirements. For example, assume that the result of a visualization is a video, but it also could be presented as an image. Another example is that same visualization result (e.g., an image) can be presented with different supporting materials.

Layer 330 includes functional blocks which perform data visualization and content publishing. As shown, layer 330 includes a meta data store 332, an analytics results store 334, built-in-visualization toolkits 336, publishing toolkits 338, and a version control service 339. More particularly, meta data store 332 is used to store meta data such as the user information, visualization asset linage information and so on. Analytics result store 334 stores the analytic result of a visualization. Built-in viz toolkits 336 contain existing data visualization toolkits, i.e., these toolkits are based on visualization toolkits currently available (for example, R script, D3.js). However, for each toolkit, an adapter is provided to enable the functionality defined in component 324. Similarly, publishing toolkits 338 contain toolkits which can convert visualizations from one format to another. As such, toolkits 338 also contain templates which are used by different data visualization results. Version control service 339 keeps track of lineage information associated with a visualization result.

Figure 4:
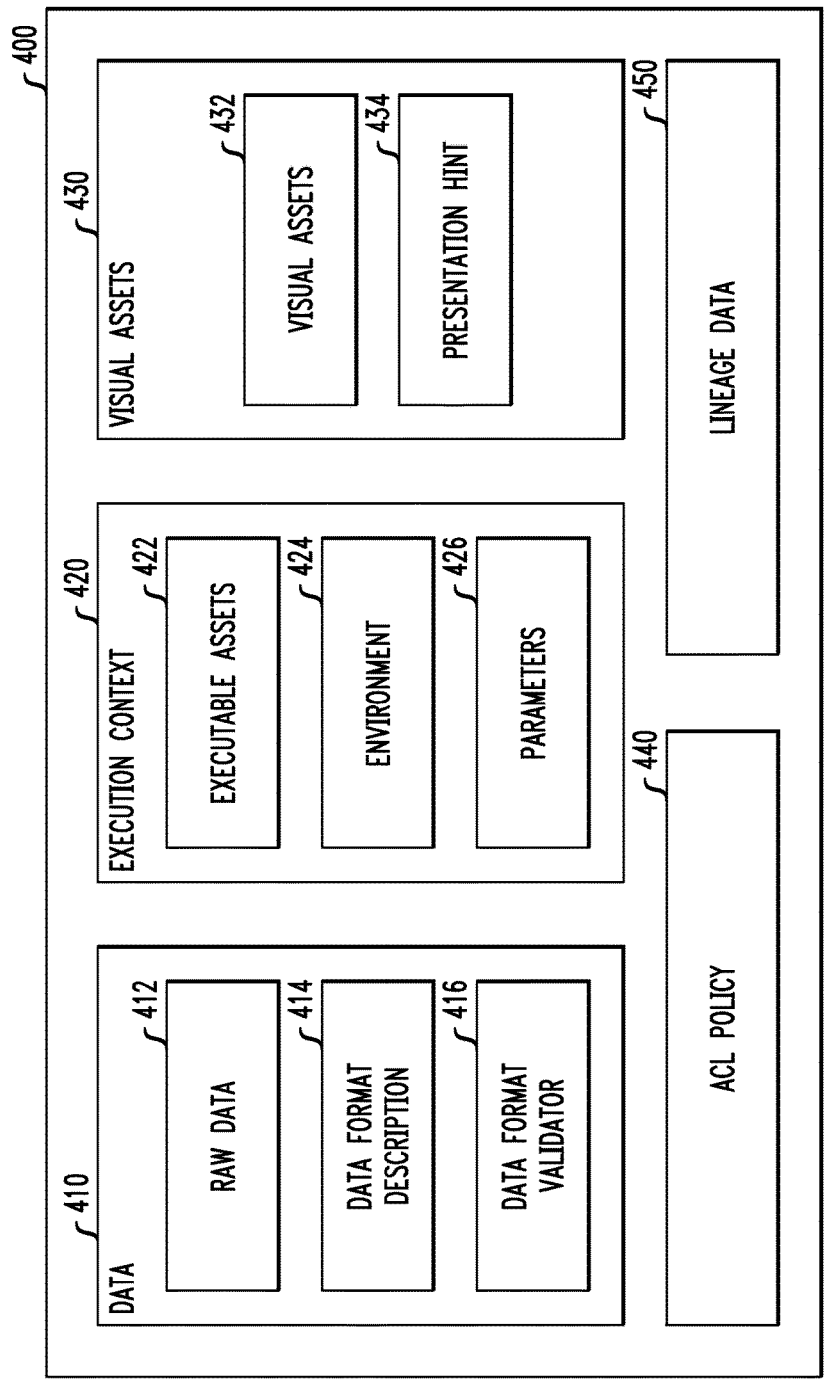
FIG. 4 shows a data visualization asset in accordance with one embodiment of the invention.

FIG. 4 shows a data visualization asset in accordance with one embodiment of the invention. As used herein, a "data visualization asset" is the result of a data visualization generation process. As shown in FIG. 4, a data visualization asset 400 includes a data component 410, an execution context component 420, a visual assets component 430, an access control list (ACL) policy 440, and lineage data 450.

The data component 410 includes the data set used to create the data visualization asset 400. This data set includes raw data 412, a data format description 414, and a data format validator 416. It is to be understood that the format description 414 is used by the validator 416 to validate the raw data 412.

The execution context component 420 includes executable assets 422, environment 424, and parameters 426. The executable assets 422 comprise the script (e.g., executable software code or other set of executable instructions) used to generate this asset 400. The script can be a user-defined script or a system-predefined script with user-defined parameters 426. Environment 424 includes, but is not limited to, hidden/implicit (i.e., transparent to the user) parameters used to create a data visualization.

The visual assets component 430 includes visual assets 432 and presentation hint 434. The visual assets 432 are the data objects that result from the execution context 420 operating on the data component 410. This portion of the asset can be considered as the final output (what is displayed to a user). The output could be any possible format such as, but not limited to, an image, a video, an HTML (HyperText Markup Language) page or other executable data object. The user can specify multiple tags to indicate the visualization type, purpose and any other important information. Presentation 'hint" refers to some meta data which is specified by the user. This meta data will then be used to decide how to present the visualization. For example, the same data visualization may be presented in different contexts to finance and legal departments. The labels "finance" or "legal" can thus be used as hints when the data visualization is presented.

The ACL policy 440 enables the user to specify how the data visualization asset 400 gets shared by other users. Lineage data 450 tracks how the data visualization asset 400 has been extended or otherwise modified.

We now describe various methodologies that are enabled by the use of a data visualization asset and system as described above.

When a user wishes to share a data visualization asset (e.g., asset 400 in FIG. 4), the user can specify how much of this asset will be shared by other users. Such sharing specifications and settings are defined by the user in an ACL policy (440).

For example, the user may only wish for the final result (visual assets 432) to be shared. Alternatively, the user may wish to share the entire asset including the data set (412) and the data set validated description (414). The user can also specify more complex sharing settings, e.g., sharing a specific part of the visual asset with an individual user or user group. Furthermore, a system administrator could configure a set of predefined sharing settings (based on specified rules, e.g., legal/regulation) which helps the user reduce the effort of sharing a visual asset.

In one embodiment, each data visualization asset generated by the users of the system is accessed via a portal (316 in FIG. 3). As such, a user follows other users, commenting on or re-sharing a visual asset. Furthermore, in one embodiment, the user can create a new visual asset by attaching his/her own data set to an existing visual asset. Still further, a user can create a new visual asset based on the data set of an existing visual asset. This could be done by introducing some new data visualization toolkit (336) or just by changing some configuration parameters (426). Also, the user can create a new visual asset by changing both the data set and execution script of an existing visual asset.

Figure 5:
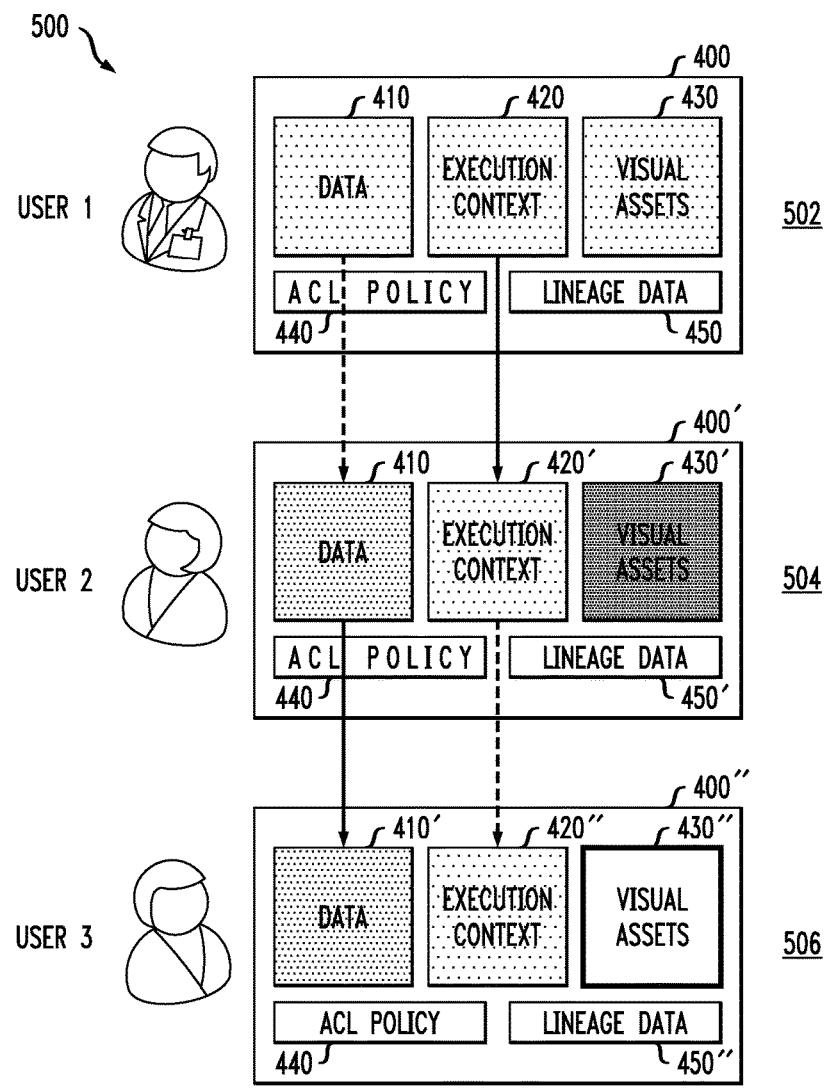
FIG. 5 shows an extensible visual asset sharing methodology in accordance with one embodiment of the invention.

FIG. 5 shows an extensible visual asset sharing methodology in accordance with one embodiment of the invention. Methodology 500 is one example illustrating certain of the sharing features described above.

As shown in FIG. 5, in step 502, user 1 creates a data visualization asset 400 using system 300, as described above. The data visualization asset 400 includes a data component 410, an execution context 420, and visual assets 430. User 1 also specifies a sharing policy via ACL policy 440 that indicates that user 2 and user 3 can modify the data component 410 and the execution context 420 as they so desire or only in certain specified ways. The lineage data 450 in data visualization asset 400 is empty at this point since the asset 400 is the original asset created and it has not yet been extended or otherwise modified.

In step 504, assume user 2 modifies the execution context 420 (represented as 420') of data visualization asset 400 thus resulting in a modified data visualization asset 400'. User 2 could be changing the executable assets 422, the environment 424 and/or the parameters 426. How user 2 modifies the execution context is dictated by the ACL policy 440 specified by user 1. Due to the modified execution context 420', a modified visual asset 430' is generated in step 504. The lineage data 450' in data visualization asset 400' specifies how the original asset 400 has been extended or otherwise modified by user 2.

In step 506, assume user 3 modifies the data component 410 of data visualization asset 400' as well as the execution context 420' thus resulting in a modified data visualization asset 400". Again, how user 3 modifies the data set and the execution context is dictated by the ACL policy 440 specified by user 1. Due to the modified data component 410' and the modified execution context 420", a modified visual asset 430" is generated in step 506. The lineage data 450" in data visualization asset 400" specifies how the asset 400' has been extended or otherwise modified by user 3, as well as maintains a record of the changes made in step 504. This gives the system a full view of the changes that caused the derivation of the original asset.

It is to be understood that a myriad of other sharing and modification possibilities exist other than those illustrated in methodology 500, given the data visualization asset and system architecture described herein in accordance with embodiments of the invention. By way of example only, multiple data visualization assets can be combined to form new data visualization assets.

For all these sharing and modification cases, the system tracks the connections between the assets. The connections could be visible to related users meaning that an original creator (author) of an asset can track the process of how a specified asset has subsequently been extended and derived. Such lineage information of all descendants of a visualization asset can be in the form of a graph, and this lineage information is useable in different use cases. The original creator can also be notified when an original asset has been modified.

Furthermore, a visual asset may be generated from a specified data set with a specified data visualization toolkit. The toolkit is part of the execution context in the asset. An example of such a commercially-available toolkit is D3.js (data-driven documents) which is a JavaScript library used to display digital data in a dynamic graphical format. However, it is to be understood that there are many existing toolkits/approaches available to create a visualization asset, and thus embodiments of the invention are not intended to be limited to any particular one.

Embodiments of the invention enable extensible visual asset creation/publishing in a variety of ways. For example, when the user creates a visual asset, he/she can specify the toolkit used (or the system can determine what toolkit is being used by checking the script/code used by user). The user specifies a data set description and another user may leverage it for extension. The user shares this asset, making it available to his/her followers. One of the user's followers may decide to extend this asset by reusing the data set and creating a new visualization script. The system can recommend a toolkit to the user for extension. In one embodiment, the recommendation is based on following considerations: (1) toolkits being used by all assets of a hierarchical tree of current assets; and/or (ii) toolkits being used by other assets with similar metadata (e.g., similar tags or other metadata). If the user wants to use a new toolkit which is not available in the current instantiation of the system, the system specifies utilities and rules to add a new toolkit. Once a new toolkit is added, it can be leveraged by all users of the system.

As mentioned above, it is beneficial for an enterprise to consolidate and maintain regulation/standardization on its data visualization assets. This is particularly advantageous for an enterprise that is globally distributed with many business units, having many potential users located remotely from one another. The collaborative data visualization system is configured to provide such regulation/standardization. An example of this functionality is shown in FIG. 6.

FIG. 6 illustrates an enterprise level visual asset consolidation methodology in accordance with one embodiment of the invention. It is assumed that a resource library (318 in FIG. 3) in the system contains raw materials and visual asset samples to help a user maintain the regulations/standardizations that the enterprise wishes to apply to all visual assets.

As shown in methodology 600 in FIG. 6, an auditor (reviewer) 601 reviews available data visualization assets in the system. If the reviewer finds an issue, such as a violation of a regulation or standardization, in a data visualization asset (602), the auditor checks all related data visualization assets (604-1, . . . , 604-N and 606-1, . . . , 606-P) connected with this data visualization asset 602. The connection between data visualization assets is determined by the auditor reviewing the lineage data in the data visualization asset 602, as well as data visualization asset metadata. The users who extended this data visualization asset then receive a notification indicating the issue. If a data visualization asset is in conflict with some regulation, the auditor can add comments to this data visualization asset. The comments will be available to all followers so that they will avoid a similar violation in the future. This approach reduces the effort to perform consolidation of the data visualization assets and to help users have a clear understanding about such regulations.

Accordingly, as described herein, embodiments enable deep sharing and collaboration of data visualizations. Additionally, the approach is extensible and pluggable, which enables users to introduce new data visualization approaches and new data visualization toolkits. In this manner, a methodology is provided which enables an enterprise to consolidate all data visualization efforts across multiple business units according to public relations guidelines or legal regulations.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:

obtaining a data visualization asset, the data visualization asset comprising a data component, an execution context component, a visual asset component, and lineage information, wherein the visual asset component comprises at least one visual asset generated from raw data of a data set of the data component by execution of one or more execution scripts of the execution context component, wherein the raw data comprises data that is validated using a data format description, and wherein the one or more execution scripts define how the at least one visual asset is generated;

enabling collaborative modification of the data visualization asset by a plurality of users by providing the plurality of users with shared access to the data visualization asset via a user interface in accordance with a given access control policy;

wherein the given access control policy comprises a first definition specifying how the data visualization asset is to be shared among the plurality of users, including how much of the data visualization asset will be shared among the plurality of users, and a second definition specifying how the plurality of users are permitted to modify the execution context component;

modifying the data visualization asset to create a modified data visualization asset in accordance with the given access control policy, wherein the modification comprises one or more of modifying at least the execution context component of the data visualization asset and extending the data visualization asset:

wherein modifying the execution context component of the data visualization asset comprises:

receiving, from at least one user of the plurality of users, a selection of one or more processes to modify the execution context component, wherein the one or more processes include each of changing the one or more execution scripts, introducing one or more additional execution scripts, and introducing or changing one or more visualization software packages; and modifying the execution context component with the selected one or more processes, wherein the at least one user of the plurality of users specifies where to access the one or more execution scripts;

wherein extending the data visualization asset comprises:

recommending a given data visualization software package based on at least one of one or more visualization software packages being used by a plurality of data visualization assets of a hierarchical tree of the plurality of data visualization assets, and one or more visualization software packages being used by one or more of the plurality of data visualization assets with similar metadata to the data visualization asset; and generating the modified data visualization asset from the data visualization asset using the given data visualization software package;

wherein the lineage information of the data visualization asset comprises information corresponding to the modification of the data visualization asset;

tracking the lineage information, including tracking how the modified data visualization asset has been modified and determining one or more connections between the modified data visualization asset and at least one other data visualization asset;

determining, based on the lineage information, one or more violations of the given access control policy by the collaborative modification; and notifying at least one user of the plurality of users of the one or more violations of the given policy by the collaborative modification;

wherein the steps are performed by at least one processing device comprising a processor coupled to a memory.

2. The method of claim 1, wherein the execution context component of the data visualization asset further comprises an execution environment for executing the one or more execution scripts.

3. The method of claim 1, wherein the execution context component of the data visualization asset further comprises one or more parameters for configuring the one or more execution scripts.

4. The method of claim 1, wherein the visual asset component of the data visualization asset further comprises presentation data for use in displaying the at least one visual asset.

5. The method of claim 1, wherein at least one of generation and modification of the data visualization asset is controlled by one or more enterprise-enforced rules.

6. The method of claim 1, wherein the step of obtaining a data visualization asset further comprises one of generating the data visualization asset and accessing the data visualization asset.

7. A computer program product comprising a processor-readable storage medium having encoded therein executable code of one or more software programs, wherein the one or more software programs when executed by the processor of the processing device implement the steps of the method of claim 1.

8. An apparatus comprising:
a memory; and
a processor operatively coupled to the memory and configured to:
obtain a data visualization asset, the data visualization asset comprising a data component, an execution context component, a visual asset component, and lineage information, wherein the visual asset component comprises at least one visual asset generated from raw data of a data set of the data component by execution of one or more execution scripts of the execution context component, wherein the raw data comprises data that is validated using a data format description, and wherein the one or more execution scripts define how the at least one visual asset is generated;
enable collaborative modification of the data visualization asset by a plurality of users by providing the plurality of users with shared access to the data visualization asset via a user interface in accordance with a given access control policy, wherein the given access control policy comprises a first definition specifying how the data visualization asset is to be shared among the plurality of users, including how much of the data visualization asset will be shared among the plurality of users, and a second definition specifying how the plurality of users are permitted to modify the execution context component;
modify the data visualization asset to create a modified data visualization asset in accordance with the given access control policy, wherein the modification comprises one or more of a modification of at least the execution context component of the data visualization asset and an extension of the data visualization asset;
wherein, in the modification of the execution context component of the data visualization asset, the processor is further configured to:
receive, from at least one user of the plurality of users, a selection of one or more processes to modify the execution context component, wherein the one or more processes include each of changing the one or more execution scripts, introducing one or more additional execution scripts, and introducing or changing one or more visualization software packages; and
modify the execution context component with the selected one or more processes, wherein the at least one user of the plurality of users specifies where to access the one or more execution scripts;
wherein, in the extension of the data visualization asset, the processor is further configured to:
recommend a given data visualization software package based on at least one of one or more visualization software packages being used by a plurality of data visualization assets of a hierarchical tree of the plurality of data visualization assets, and one or more visualization software packages being used by one or more of the plurality of data visualization assets with similar metadata to the data visualization asset; and
generate the modified data visualization asset from the data visualization asset using the given data visualization software package;
wherein the lineage information of the data visualization asset comprises information corresponding to the modification of the data visualization asset
track the lineage information, including tracking how the modified data visualization asset has been modified and determining of one or more connections between the modified data visualization asset and at least one other data visualization asset;
determine, based on the lineage information, one or more violations of the given access control policy by the collaborative modification; and
notify at least one user of the plurality of users of the one or more violations of the given policy by the collaborative modification.

9. The apparatus of claim 8, wherein at least one of generation and modification of the data visualization asset is controlled by one or more enterprise-enforced rules.

10. The apparatus of claim 8, wherein obtaining a data visualization asset further comprises one of generating the data visualization asset and accessing the data visualization asset.

11. A system comprising:
a plurality of computing devices; and
a collaborative data visualization system operatively coupled to the plurality of computing devices and configured to:

enable a user through at least one of the plurality of computing devices to obtain a data visualization asset comprising a data component, an execution context component, a visual asset component, and lineage information, wherein the visual asset component comprises at least one visual asset generated from raw data of a data set of the data component by execution of one or more execution scripts of the execution context component, wherein the raw data comprises data that is validated using a data format description, and wherein the one or more execution scripts define how the at least one visual asset is generated;

enable collaborative modification of the data visualization asset by a plurality of users by providing the plurality of users with shared access to the data visualization asset via a user interface in accordance with a given access control policy, wherein the given access control policy comprises a first definition specifying how the data visualization asset is to be shared among the plurality of users, including how much of the data visualization asset will be shared among the plurality of users, and a second definition specifying how the plurality of users are permitted to modify the execution context component;

modify the data visualization asset to create a modified data visualization asset in accordance with the given access control policy, wherein the modification comprises one or more of a modification of at least the execution context component of the data visualization asset and an extension of the data visualization asset;

wherein, in the modification of the execution context component of the data visualization asset, the collaborative data visualization system is further configured to:

receive, from at least one user of the plurality of users, a selection of one or more processes to modify the execution context component, wherein the one or more processes include each of changing the one or more execution scripts, introducing one or more additional execution scripts, and introducing or changing one or more visualization software packages; and modify the execution context component with the selected one or more processes, wherein the at least one user of the plurality of users specifies where to access the one or more execution scripts;

wherein, in the extension of the data visualization asset, the collaborative data visualization system is further configured to:

recommend a given data visualization software package based on at least one of one or more visualization software packages being used by a plurality of data visualization assets of a hierarchical tree of the plurality of data visualization assets, and one or more visualization software packages being used by one or more of the plurality of data visualization assets with similar metadata to the data visualization asset; and generate the modified data visualization asset from the data visualization asset using the given data visualization software package;

wherein the lineage information of the data visualization asset comprises information corresponding to the modification of the data visualization asset;

track the lineage information, including tracking how the modified data visualization asset has been modified and determining one or more connections between the modified data visualization asset and at least one other data visualization asset;

determine, based on the lineage information, one or more violations of the given access control policy by the collaborative modification; and notify at least one user of the plurality of users of the one or more violations of the given policy by the collaborative modification.

12. The system of claim 11, wherein the collaborative data visualization system is part of a cloud computing infrastructure.

13. The method of claim 1, wherein the one or more processes that the at least one user of the plurality of users can select to modify the execution context component further include specifying at least one of where to obtain at least one of raw data and an analytic result, and where to store results of the one or more execution scripts.

14. The apparatus of claim 8, wherein the execution context component of the data visualization asset further comprises an execution environment for executing the one or more execution scripts.

15. The apparatus of claim 8, wherein the execution context component of the data visualization asset further comprises one or more parameters for configuring the one or more execution scripts.

16. The apparatus of claim 8, wherein the visual asset component of the data visualization asset further comprises presentation data for use in displaying the at least one visual asset.

17. The system of claim 11, wherein the execution context component of the data visualization asset further comprises an execution environment for executing the one or more execution scripts.

18. The system of claim 11, wherein the execution context component of the data visualization asset further comprises one or more parameters for configuring the one or more execution scripts.

19. The method of claim 1, wherein the visual asset component further comprises meta data associated with a manner of presentation of the at least one visual asset.

20. The method of claim 1, wherein the data visualization asset is standardized based on one or more regulations.

* * * * *